(12) United States Patent
Tada et al.

(10) Patent No.: US 11,193,462 B2
(45) Date of Patent: Dec. 7, 2021

(54) AIR CLEANER

(71) Applicant: HONDA MOTOR CO., LTD., Tokyo (JP)

(72) Inventors: Masashi Tada, Wako (JP); Seiichiro Eguchi, Wako (JP); Yohei Suzuki, Wako (JP); Kazuki Seri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 397 days.

(21) Appl. No.: 16/283,430

(22) Filed: Feb. 22, 2019

(65) Prior Publication Data

US 2019/0264642 A1 Aug. 29, 2019

(30) Foreign Application Priority Data

Feb. 26, 2018 (JP) .............................. JP2018-032524

(51) Int. Cl.
*F02M 35/12* (2006.01)
*F02M 35/02* (2006.01)
*F02M 35/024* (2006.01)
*F02M 35/16* (2006.01)
*F02M 35/14* (2006.01)
*B62K 11/04* (2006.01)

(52) U.S. Cl.
CPC .... *F02M 35/1272* (2013.01); *F02M 35/0201* (2013.01); *F02M 35/0204* (2013.01); *F02M 35/0209* (2013.01); *F02M 35/02491* (2013.01); *F02M 35/1283* (2013.01); *F02M 35/1288* (2013.01); *F02M 35/14* (2013.01); *F02M 35/162* (2013.01); *B62K 11/04* (2013.01)

(58) Field of Classification Search
CPC ............. F02M 35/1272; F02M 35/162; F02M 35/1283; F02M 35/0209; F02M 35/14; F02M 35/0204; F02M 35/0201; F02M 35/02491; F02M 35/1288; B62K 11/04; B62J 37/00

See application file for complete search history.

(56) References Cited

U.S. PATENT DOCUMENTS

2002/0040699 A1* 4/2002 Yokoyama ....... F02M 35/10196
123/184.21
2017/0167453 A1* 6/2017 Koyama ................ B60K 13/02

FOREIGN PATENT DOCUMENTS

| JP | S53-059125 A | 5/1978 |
| JP | S60-026157 A | 2/1985 |
| JP | 62-113676 A | 5/1987 |

(Continued)

OTHER PUBLICATIONS

Office Action dated Sep. 10, 2019 issued in the corresponding Japanese Patent Application No. 2018-032524 with the English translation thereof.

(Continued)

*Primary Examiner* — Jacob M Amick
*Assistant Examiner* — Charles J Brauch
(74) *Attorney, Agent, or Firm* — Carrier Blackman & Associates, P.C.; Joseph P. Carrier; Anne G. Sabourin

(57) ABSTRACT

In an air cleaner, an air cleaner case having an upper opening which opens upward is formed. The air cleaner case is formed of a front wall, a rear fender, and right and left side covers. The upper opening is closed by a seat. A sound absorbing member is bonded to a bottom plate of the seat and housed in an air cleaner space. The intake noise in the air cleaner is absorbed by the sound absorbing member.

7 Claims, 9 Drawing Sheets

(56) References Cited

FOREIGN PATENT DOCUMENTS

| | | | |
|---|---|---|---|
| JP | H03-193583 | A | 8/1991 |
| JP | 04-306183 | A | 10/1992 |
| JP | 04306183 | A * | 10/1992 |
| JP | H05-57352 | U | 7/1993 |
| JP | 2003-154535 | A | 5/2003 |
| JP | 2007-002756 | A | 1/2007 |
| JP | 2010-132121 | A | 6/2010 |
| JP | 2013-189172 | A | 9/2013 |
| JP | 2013-194623 | A | 9/2013 |
| JP | 2014-125135 | A | 7/2014 |

OTHER PUBLICATIONS

Extended European search report dated May 16, 2019 issued in the corresponding EP Patent Application 19159292.2.

* cited by examiner

AIR CLEANER

BACKGROUND

1. Technical Field

The present invention relates to an air cleaner, particularly to a sound absorbing structure in an air cleaner which is provided beneath a seat of a saddled vehicle and which has its upper opening openably closed by the seat.

2. Description of the Background

For the purpose of reducing the intake noise of an air cleaner, there exists a technique of bonding a sound absorbing member to the upper wall of an air cleaner case. An air cleaner employing such a technique includes a removable lid (an air cleaner cover) at the upper part of the air cleaner case. The lid surrounds a clean room, and a sound absorbing member is bonded to the inner side of the lid (see Patent Literature 1).

CITATION LIST

Patent Literature

Patent Literature 1: Japanese Unexamined Patent Application Publication No. 60-26157

BRIEF SUMMARY

In the air cleaner, the lid surrounding the clean room is used to the advantage of bonding the sound absorbing member thereto so that the intake noise is absorbed.

On the other hand, in a structure in which the air cleaner case is disposed beneath the seat so that the opening of the air cleaner case opening upward is closed by the seat, there exists no lid (which is referred to the air cleaner cover or just the cover) to which the sound absorbing member is to be attached.

An object of the present invention is to provide an air cleaner for a saddled vehicle of such a structure realizing effective attachment of a sound absorbing member.

In order to solve the above-described problem, the present embodiment provides an air cleaner including:

an air cleaner case (30b) provided beneath a seat (21) for a saddled vehicle, the air cleaner case (30b) having an upper opening (30c) opening upward, the upper opening (30c) configured to be closed by a bottom plate (33) of the seat (21); and a sound absorbing member (50) bonded to the bottom plate (33) of the seat (21), the sound absorbing member (50) disposed in the air cleaner.

In this structure in which the sound absorbing member (50) is bonded to the bottom plate (33) of the seat, closing the opening at the upper part of the air cleaner case by the bottom plate (33) of the seat allows the bottom plate (33) of the seat and the sound absorbing member (50) to function as a lid for closing the opening of the air cleaner case and, simultaneously, reduce the intake noise of the air cleaner.

In the present embodiment in which the sound absorbing member (50) is bonded to the bottom plate (33) of the seat (21), closing the opening at the upper part of the air cleaner case (30b) by the bottom plate (33) of the seat allows the bottom plate (33) of the seat and the sound absorbing member (50) to function as a lid for closing the opening at the upper part of the air cleaner case and, simultaneously, disposes the sound absorbing member (50) inside the air cleaner to absorb the intake noise of the air cleaner.

Thus, use of the bottom plate (33) of the seat eliminates the need for a lid dedicated to the air cleaner. Furthermore, while there exists no lid as the target of attaching the sound absorbing member (50), the bottom plate (33) of the seat is used to the advantage of bonding the sound absorbing member (50). The sound absorbing member (50) being bonded to the bottom plate (33) of the seat contributes to effectively absorbed intake noise in the air cleaner.

DETAILED DESCRIPTION

In the following, a description will be given of an embodiment. Note that, in the present application, the front and rear directions, the top and bottom directions, and the right and left directions are referred to a vehicle to which the present invention is applied. As necessary, the drawings indicate the front side by arrow F (the rear side is the direction opposite thereto), the upper side by arrow U (the lower side is the direction opposite thereto), the right side by arrow R, and the left side by arrow L.

Figure 1:
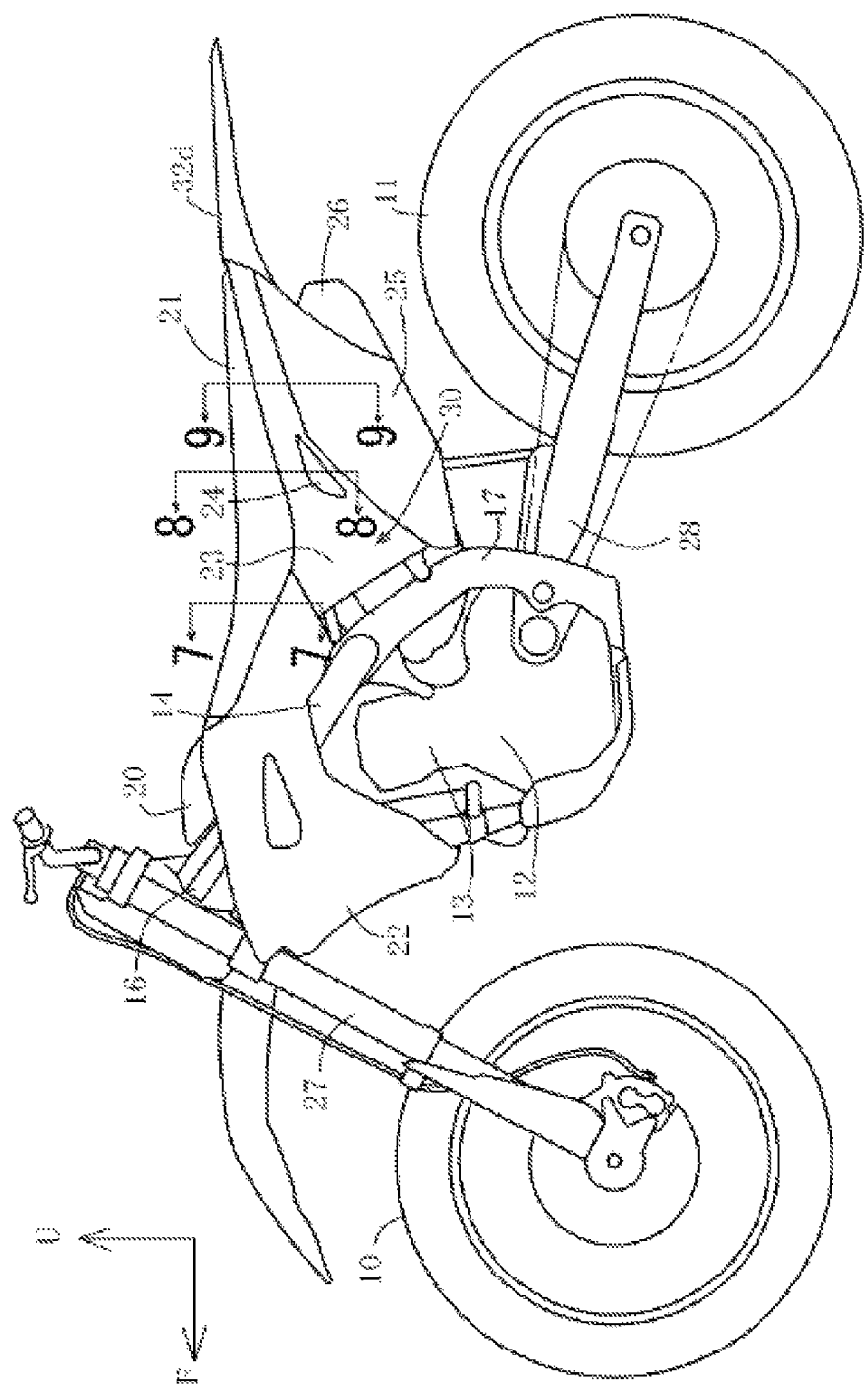
FIG. 1 is a side view for a saddled vehicle to which the present embodiment is applied.
Figure 2:
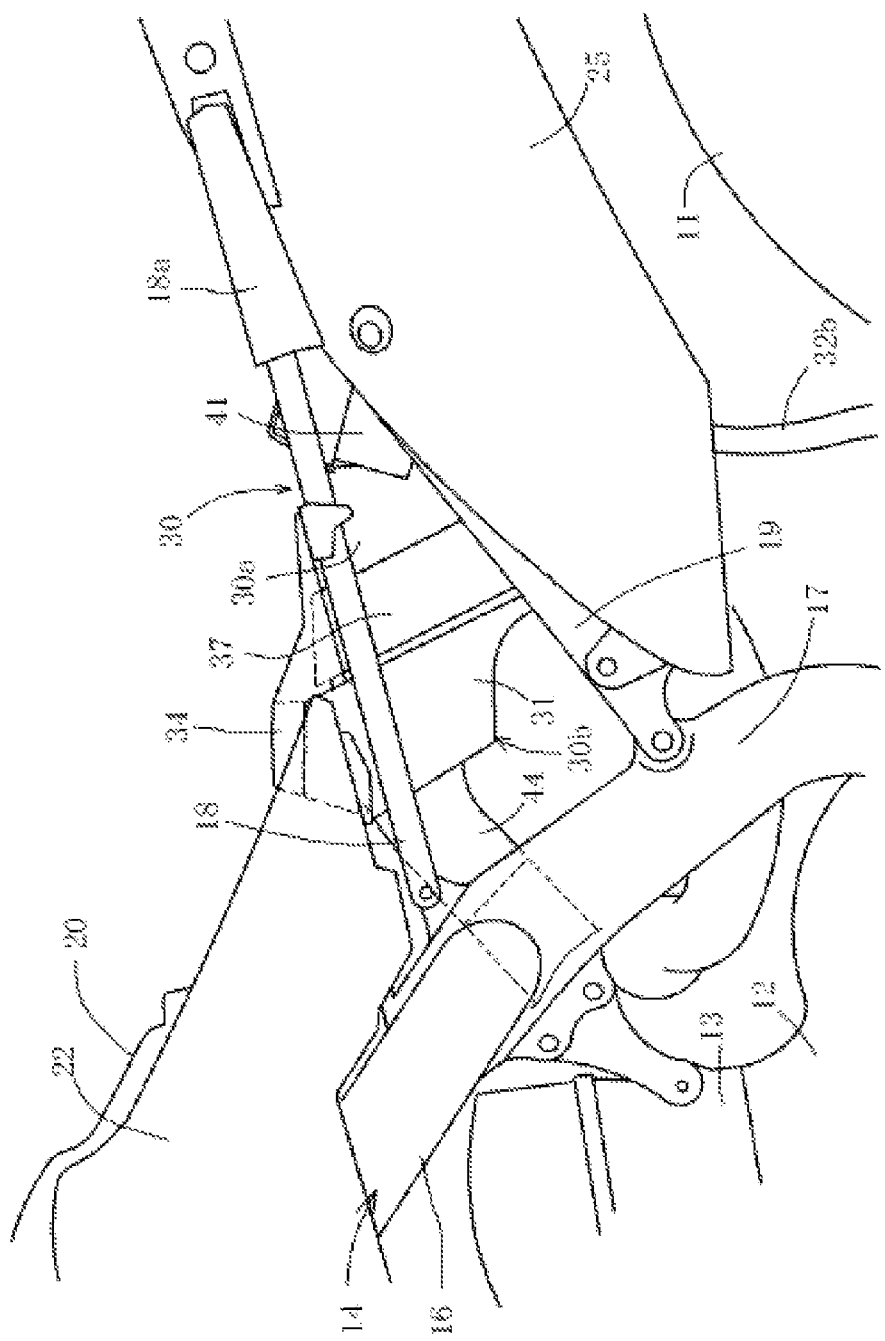
FIG. 2 is a partial enlarged side view of the vehicle.
Figure 3:
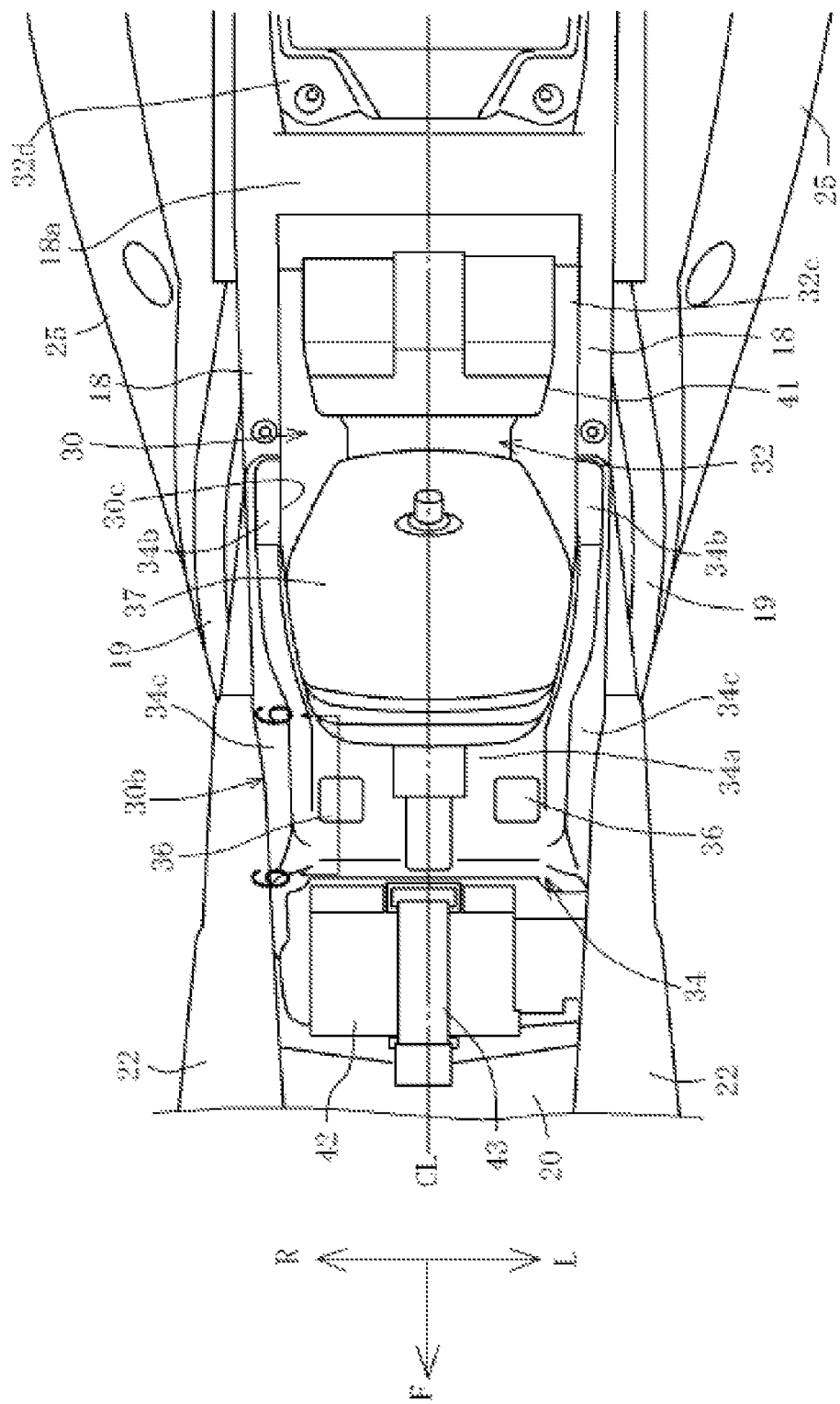
FIG. 3 is a plan view of FIG. 2.
Figure 4:
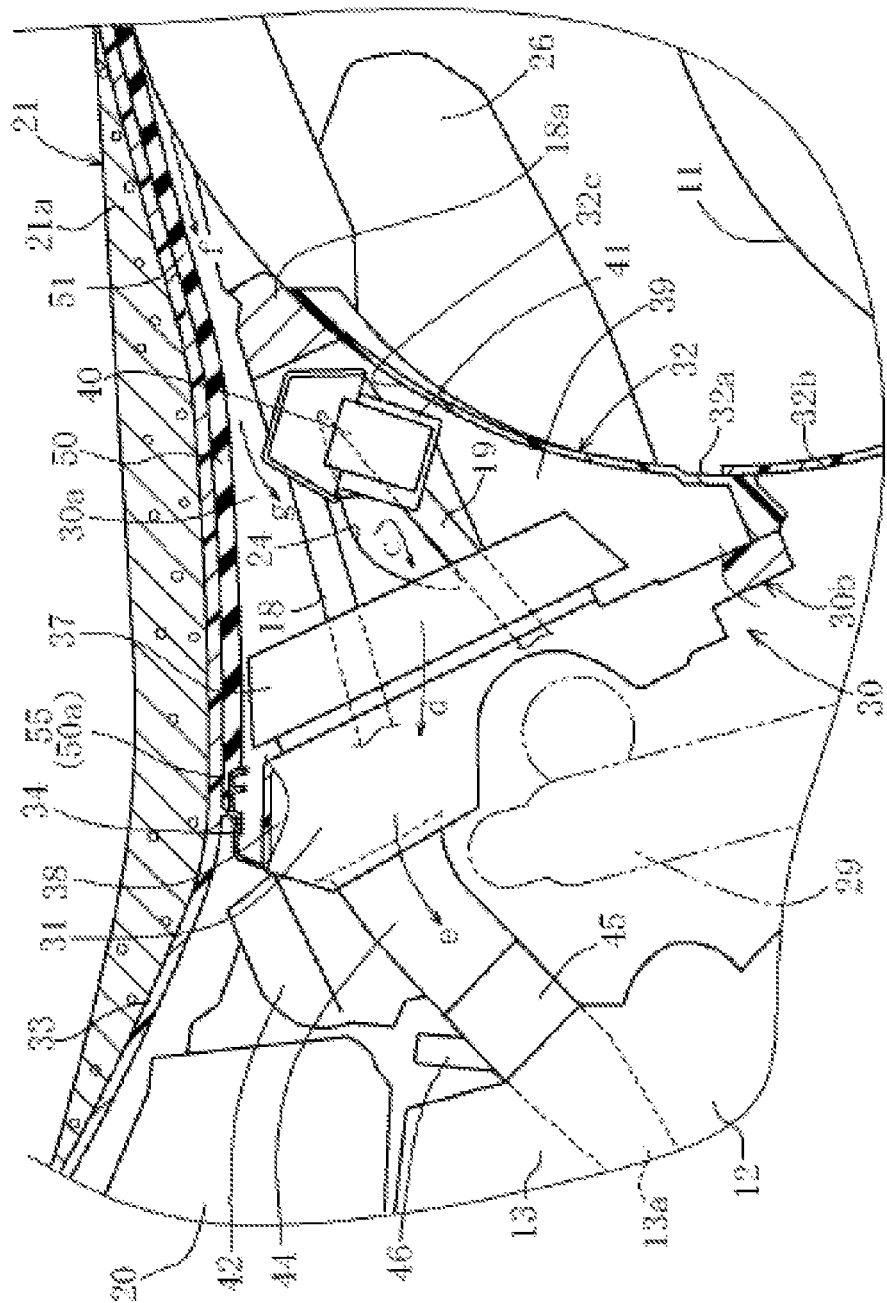
FIG. 4 is a cross-sectional view taken along the vehicle body center line in FIG. 3.
Figure 5:
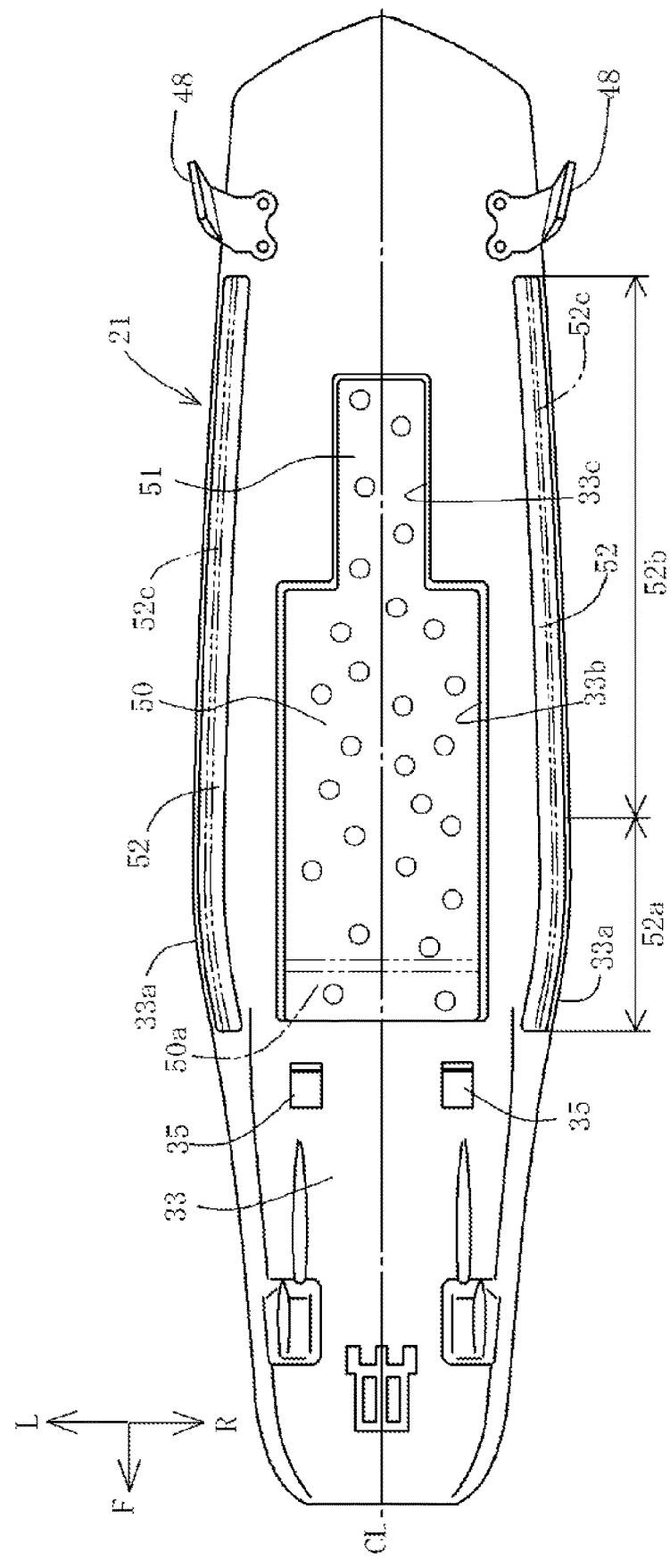
FIG. 5 is a bottom view of a seat.

FIG. 1 is a side view of an off-road motorcycle (an exemplary saddled vehicle) to which the present invention is applied. FIG. 2 is a partial enlarged side view showing part of FIG. 1 without a seat and a side cover. FIG. 3 is a plan view of the site shown in FIG. 2. FIG. 4 is a cross-sectional view taken along vehicle body center line CL in FIG. 3 (note that FIG. 4 shows the seat). FIG. 5 is a bottom view of the seat.

Firstly, a description will be given of the schematic structure of the entire vehicle. As shown in FIG. 1, the motorcycle includes an engine 12 installed between a front wheel 10 and a rear wheel 11. The engine 12 includes a cylinder 13 which is slightly inclined frontward and supported by a cradle-type vehicle body frame 14. The vehicle body frame 14 includes main frames 16 extending rearward obliquely downward from a head pipe 15, pivot frames 17 extending downward from the rear part of the main frames 16, and seat rails 18 (FIG. 2) extending rearward obliquely upward from around the rear part of the main frames 16. Below the seat rails 18, rear stays 19 (FIG. 2) for reinforcement are provided. The main frames 16, the pivot frames 17, the seat rails 18, and the rear stays 19 are provided in right and left pairs.

Above the cylinder 13, a fuel tank 20 is disposed as being supported by the main frames 16. Behind the fuel tank 20, a seat 21 is disposed. The seat 21 is removably attached to the vehicle body. When the seat 21 is attached, the seat 21 is supported by the seat rails 18 and covers from above the opening at the upper part of an air cleaner case which will be described later, while having its front part engaged with the air cleaner (hereinafter this state is simply referred to as "when the seat 21 is attached").

The right and left sides of the vehicle body below the fuel tank 20 and the seat 21 are covered with a front cover 22. The rear part of the front cover 22 is connected to the side covers 23 on the rear side of the pivot frames 17. The side covers 23 are each a triangular vehicle body cover member as seen in a side view covering the space defined to be substantially triangular as seen in a side view by one pivot frame 17, one seat rail 18, and one rear stay 19. An intake opening 24 opens at each of the side covers 23.

The rear ends of the side covers 23 are connected to a rear cover 25. The rear cover 25 covers a muffler 26 while extending below the rear half of the seat 21 and above the rear wheel 11. Further, the rear edge of the seat 21 is continuous to a tail part 32d. The tail part 32d serves also as a rear extending part of a rear fender (described later), and extends rearward above the rear wheel 11, to form part of the rear cover 25.

The vehicle further includes a front fork 27, rear swing arms 28, and a rear cushion unit 29.

Beneath the front part of the seat 21 and between the right and left side covers 23, an air cleaner 30 is provided. In the following, with reference to FIGS. 2 to 5, mainly FIGS. 2 and 4, the overview of the air cleaner 30 is described. As shown in FIGS. 2 and 4, the air cleaner 30 includes an air cleaner space 30a (FIG. 4) which is the space between the right and left seat rails 18. The front of the air cleaner space 30a is closed by a front wall 31, and the rear and the bottom thereof are closed by a rear fender 32. Further, the right and left sides are closed by the side covers 23.

That is, the front wall 31, the rear fender 32, and the right and left side covers 23 form an air cleaner case 30b. At the upper part of the air cleaner case 30b, an upper opening 30c (FIG. 3) opening upward is provided. The upper opening 30c is closed by a bottom plate 33 of the seat 21.

Accordingly, the right and left side covers 23 serve as the side walls of the air cleaner case 30b. The bottom plate 33 replaces a lid which covers the upper opening 30c of the air cleaner case 30b, and serves also as the upper wall of the air cleaner case 30b.

Further, the upper opening 30c of the air cleaner case 30b is a portion surrounded by a reinforcing member 34 provided to extend from above the front wall 31 to above the seat rails 18, and a crossing part 18a (FIG. 3) coupling between the upper ends of the right and left side covers 23 (upper ends of rising wall parts 23a which will be described later) and between the right and left seat rails 18.

The front wall 31 is a hollow member forming a clean room. The front wall 31 is positioned on the rear side of the pivot frames 17, with its upper part inclined frontward conforming to the inclination of the pivot frames 17 (FIG. 2). The cylinder 13 is positioned on the front side of the front wall 31. The cylinder 13 and the front wall 31 are disposed on the front and rear sides with reference to the pivot frames 17 interposed between them.

The front wall 31 connects between the right and left seat rails 18, and the upper part thereof projects higher than the seat rails 18.

On the front wall 31, the reinforcing member 34 is provided. The reinforcing member 34 reinforces the upper part of the front wall 31, and supports the front part of the seat 21. The reinforcing member 34 forms part of the air cleaner case 30b. When the seat 21 is attached to the vehicle body, part of the seat 21 engages with the reinforcing member 34.

The reinforcing member 34 is the engaging part for the seat 21 in the present application. The reinforcing member 34 is a lightweight and high-stiffness component formed of carbon fibers or the like. Note that, the reinforcing member 34 may be integrated with the front wall 31 as part of the front wall 31.

As shown in FIG. 3, the reinforcing member 34 is substantially U-shaped as seen in a plan view, and includes a crossing part 34a extending across the right and left seat rails 18, and mounting legs 34b extending rearward from the right and left sides of the crossing part 34a, to be overlaid and fixed onto the seat rails 18.

The upper part of the crossing part 34a projects higher than the rear end of the front cover 22 (see FIG. 2). On the right and left sides at the upper surface of the crossing part 34a, engaged holes 36 with which engaging hooks 35 (see FIG. 6) formed at the front part lower surface of the bottom plate 33 of the seat 21 are provided.

In the opening edge surrounding the upper opening 30c, the right and left side parts are wall parts rising upward. The wall parts consist of rising wall parts 23a which are the upper ends of the side covers 23, and reinforcing member side parts 34c. Note that, the crossing part 34a of the reinforcing member 34 also forms part of the opening edge surrounding the upper opening 30c. On the outer side of the right and left parts in the opening edge, later-described side walls 33a provided at the bottom plate 33 of the seat 21 are overlaid with a predetermined gap. In the gap, later-described side seals 52 are interposed (see FIGS. 7 and 8).

As shown in FIG. 4, the air cleaner space 30a is divided into the front half and the rear half by a filter 37 disposed in parallel to and on the rear side of the front wall 31. The front half between the front wall 31 and the filter 37 is a clean room 38, and the rear half on the rear side than the filter 37 is a dirty room 39.

The rear of the dirty room 39 is closed by the rear fender 32. The rear fender 32 forms an inclined surface extending arc-shaped obliquely upward rearward from the front part 32a, so that the arc projects upward. The upper part 32c of the rear fender 32 is supported by the crossing part 18a coupling between the right and left seat rails 18.

The dirty room 39 communicates with the intake openings 24 opened at the side covers 23. As indicated by arrow c, the outside air taken into the dirty room 39 is sent frontward, to be filtered with the filter 37 as indicated by arrow d. The cleaned air is sent to the clean room 38, and further to an intake tube 44 as indicated by arrow e.

In the dirty room 39, a battery 40 is disposed. The battery 40 is positioned around the upper part of the front part 32a of the rear fender 32. The battery 40 in a rearward inclined attitude approximating the inclination of the front part 32a is supported in a battery case 41 provided in front of the crossing part 18a. Between the front side of the reinforcing member 34 and the rear end of the fuel tank 20, an ECU 42 is disposed to be elongated in the right-left direction. The center of the ECU 42 is supported by a band 43 (FIG. 3) extending between the rear end of the fuel tank 20 and the upper surface of the crossing part 34a.

The intake tube 44 extends obliquely downward frontward from the upper part of the front wall 31, and coupled to an intake port 13a of the cylinder 13 via a throttle body 45. The throttle body 45 is provided with an injector 46, and has its fuel injection controlled by the ECU 42.

Accordingly, the cleaned air cleaned by the filter 37 enters, from the clean room 38, the throttle body 45 through the intake tube 44. In the throttle body 45, the cleaned air and fuel are mixed with each other to become the air-fuel mixture, and supplied to the intake port 13a.

Note that, below the intake tube 44 and in front of the front wall 31, a rear cushion unit 29 functioning as the buffer for a rear wheel suspension apparatus is disposed. The intake tube 44 is disposed in the front-rear direction so as to detour the upper part of the rear cushion unit 29.

The lower end of the front wall 31 is coupled airtightly with the tip of the front part 32a. The rear fender 32 further includes a mudguard 32b.

Next, with reference mainly to FIGS. 4 and 5, a description will be given of the seat 21 including the bottom plate 33 which forms the upper part of the air cleaner. The seat 21 is elongated in the front-rear direction. The front part thereof is overlaid on the rear surface of the fuel tank 20 which forms an inclined surface extending obliquely downward rearward. The rear end thereof extends above the rear end of the muffler 26, and is connected to the tail part 32d.

The seat 21 is removably fixed by the engaging hooks 35 formed at the bottom plate 33 in the front part engaging with the engaging holes 36 of the reinforcing member 34, and stays 48 (FIG. 5) provided on the right and left sides at the rear part of the bottom plate 33 fastening with the vehicle body frame behind the crossing part 18a. Removing the seat 21 opens the upper opening 30c of the air cleaner case 30b, allowing the inside of the air cleaner 30 to be maintained.

As shown in FIG. 4, the seat 21 includes the bottom plate 33 and a seat cushion 21a overlaid on the bottom plate 33.

The bottom plate 33 is formed of any appropriate resin which exhibits stiffness. The seat cushion 21a is formed of flexible foam having an appropriate elasticity. In the present embodiment, the seat cushion 21a is formed of expanded polystyrene. Expanded polystyrene is closed cell foam, which does not absorb sound but contributes to reducing weight. While not shown in the drawings, the seat cushion 21a is covered with a surface member.

Figure 7:
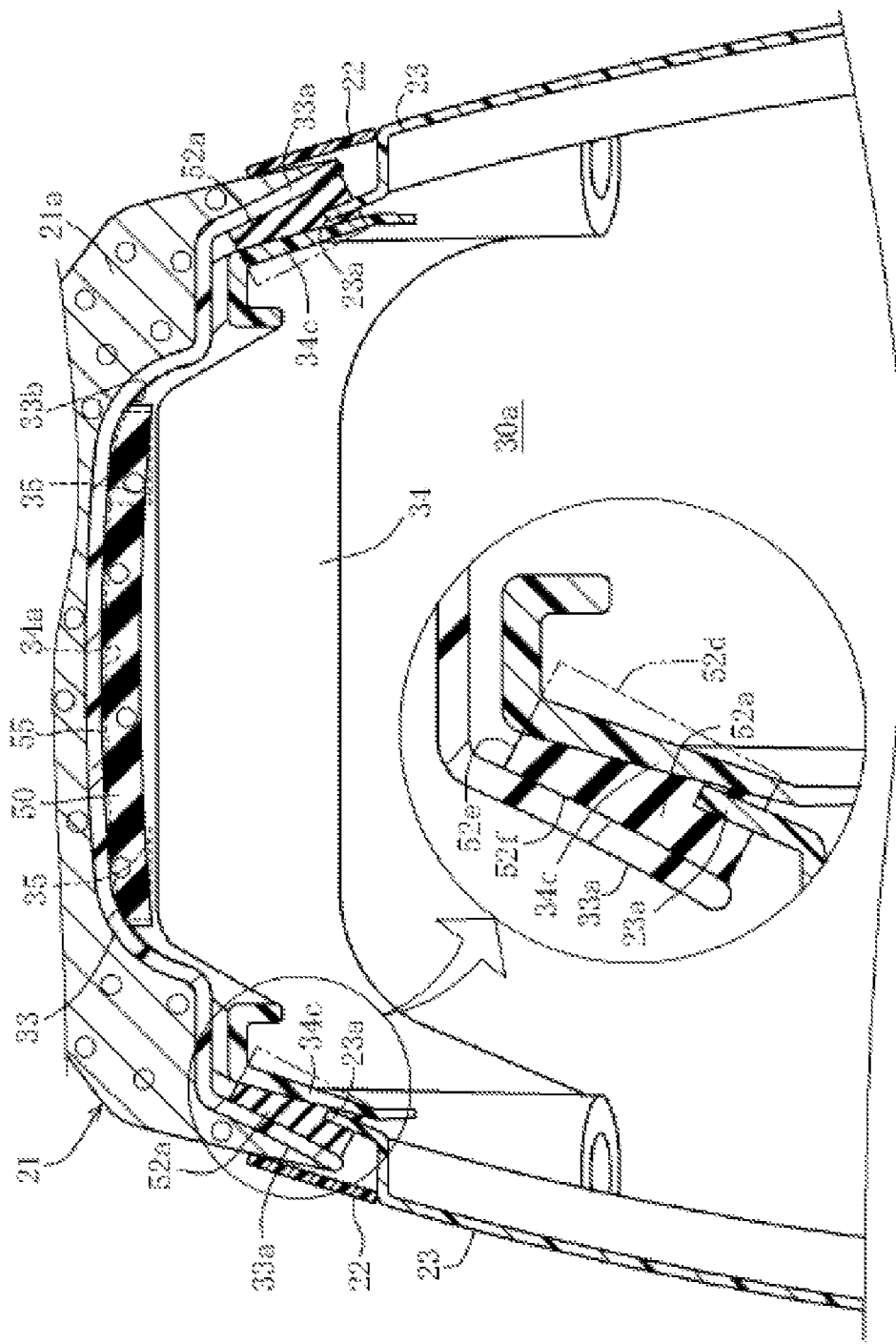
FIG. 7 is a cross-sectional view taken along line 7-7 in FIG. 1.
Figure 8:
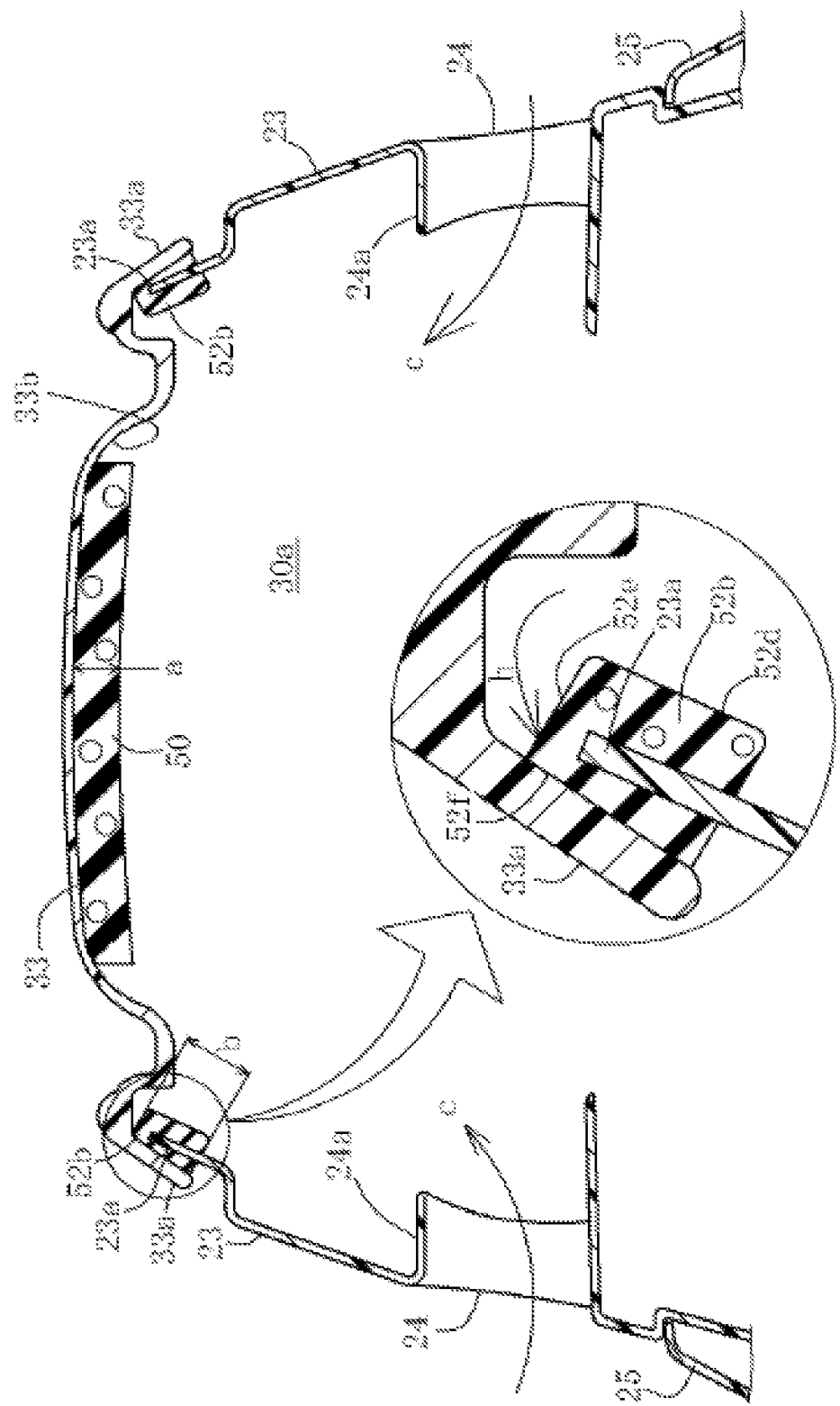
FIG. 8 is a cross-sectional view taken along line 8-8 in FIG. 1.
Figure 9:
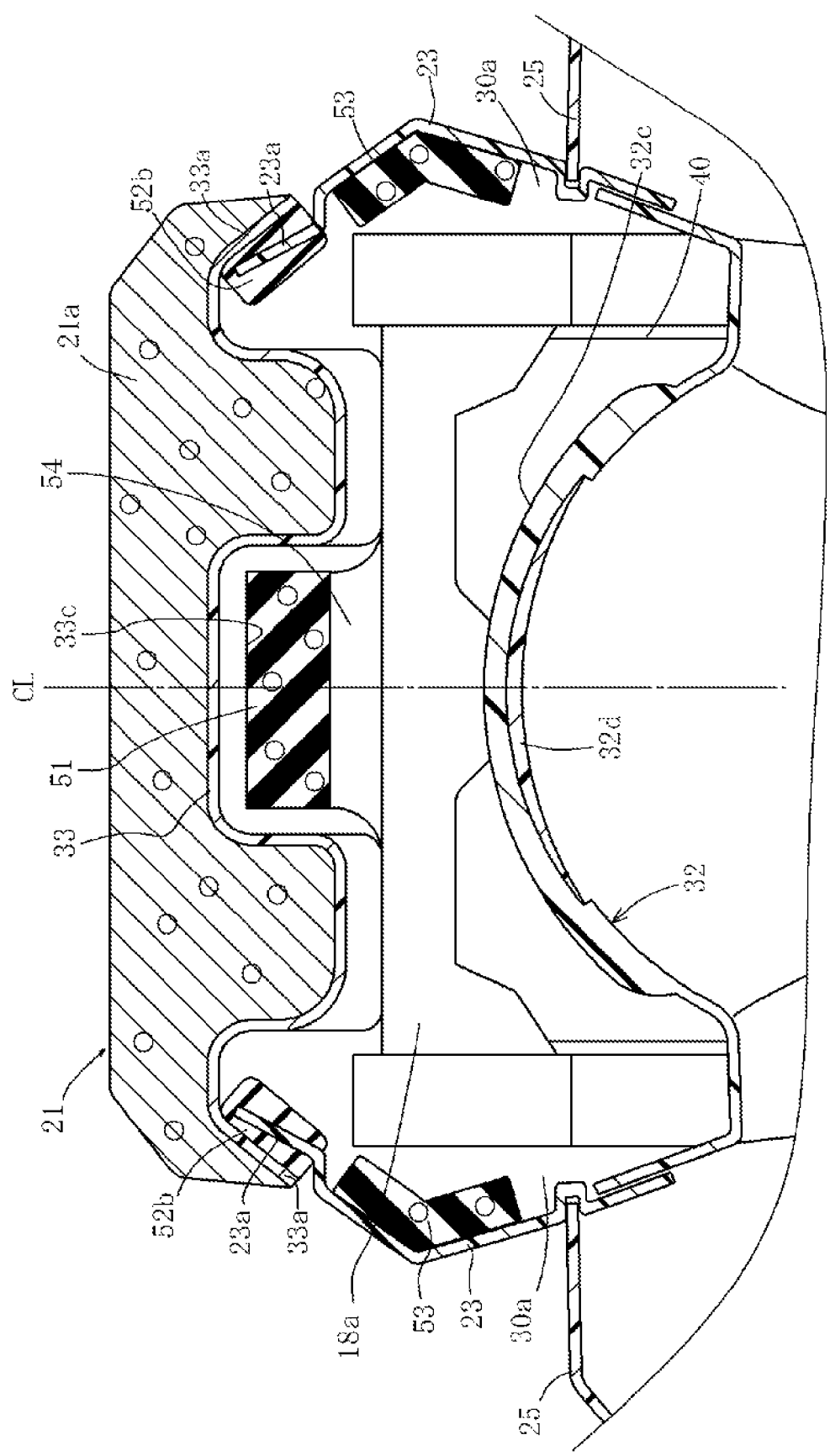
FIG. 9 is a cross-sectional view taken along line 9-9 in FIG. 1.

As shown in FIG. 5, the right and left sides of the bottom plate 33 form inclined surface-like side walls 33a which extend as being bent downward (see FIGS. 7 to 9). When the seat 21 is attached, the side walls 33a of the bottom plate 33 overlap with the outer side of the opening edge which surrounds the upper opening 30c of the air cleaner case 30b.

At the intermediate part in the front-rear direction of the bottom plate 33, a substantially rectangular central recess 33b elongated in the front-rear direction is provided. In the central recess 33b, a sound absorbing member 50 is housed and bonded to the bottom plate 33.

A front part 50a of the sound absorbing member 50 is a seal part which is pressed by the reinforcing member 34.

From the central part in the right-left direction of the rear part of the sound absorbing member 50, a band-like narrow extending part 51 extends rearward, housed in an extending recess 33c formed rearward from the central part in the right-left direction of the rear part of the central recess 33b, and bonded to the bottom plate 33. The extending recess 33c extends rearward past the crossing part 18a, and forms a gap relative to the crossing part 18a.

Accordingly, the rear end of the sound absorbing member 50 is positioned near the crossing part 18a. The extending part 51 extends greatly rearward past the crossing part 18a to become near to the stays 48. Through the extending part 51, the outside air on the rear side of the seat 21 is taken into the air cleaner case 30b.

The sound absorbing member 50 has a dimension enough to substantially cover the upper opening 30c of the air cleaner case 30b. When the seat 21 is placed on the air cleaner case 30b to close the upper opening 30c, the sound absorbing member 50 excluding the front part 50a and the extending part 51 is disposed inside the air cleaner 30 as being housed in the upper opening 30c of the air cleaner case 30b.

In this manner, by the sound absorbing member 50 being housed in the upper opening 30c, the sound absorbing member 50 enters inside the air cleaner. Thus, without the necessity of raising the height level of the bottom plate 33 of the seat 21, the sound absorbing member 50 is provided. That is, the height of the seat is minimized.

Here, the similar effect may be exhibited by the sound absorbing member 50 being set at the opening plane of the upper opening 30c. For example, when the bottom part of the central recess 33b is positioned higher than the opening plane of the upper opening 30c, the sound absorbing member 50 can be disposed at the opening plane of the upper opening 30c without the necessity of raising the height level of the entire bottom plate 33 of the seat 21. In this case also, the sound absorbing member 50 is housed in the air cleaner space 30a whose upper side is closed by the bottom plate 33 of the seat 21, whereby the sound absorbing effect is exhibited. Both the state where the sound absorbing member 50 is housed inside the upper opening 30c of the air cleaner case 30b and the state where the sound absorbing member 50 is at the opening plane of the upper opening 30c are the state where the sound absorbing member 50 is disposed inside the air cleaner 30.

On the inner side of each of the right and left side walls 33a of the bottom plate 33, a side seal 52 is attached. The side seal 52 is a band-like member elongated in the front-rear direction. The side seal 52 is a member independent of the sound absorbing member 50. When the seat 21 is attached, the side seals 52 seal between the side walls 33a of the bottom plate 33 and the opening edge surrounding the upper opening 30c of the air cleaner case 30b.

The front ends of the side seals 52 are at the position substantially identical in the front-rear direction to the front end of the sound absorbing member 50. The rear ends of the side seals 52 extend rearward than the sound absorbing member 50, to reach the position near the stays 48 substantially identically to the rear end of the extending part 51.

Note that, when the seat 21 is attached, the front parts 52a of the side seals 52 are pressed and compressed between the side walls 33a of the bottom plate 33 and the reinforcing member 34 (see FIG. 7), and the rear parts 52b of the side seals 52 are pressed and compressed between the side walls 33a of the bottom plate 33 and the side covers 23 (see FIG. 8).

The sound absorbing member 50 and the side seals 52 are formed of identical open cell flexible foam, which is EPDM (ethylene propylene diene monomer rubber) in the present embodiment. They may be formed of materials different from each other.

The sound absorbing member 50 and the side seals 52 are formed of a material soft enough to easily elastically deform and be compressed in response to application of predetermined force (for example, the pushing force in attaching the seat 21). According to usage, the sound absorbing member 50 and the side seals 52 exhibit excellent sound absorbing performance and sound insulating performance That is, in the non-compressed state, the open cell foam structure absorbs the intake noise of the air cleaner 30. In the compressed state, the sealing function is exhibited, which prevents noise from leaking outside the air cleaner 30. Accordingly, the sound absorbing member 50 and the side seals 52 implement the sound-absorbing and sound-insulating structure of the air cleaner.

Next, a detailed description will be given of the sound-absorbing and sound-insulating structure.

Figure 6:
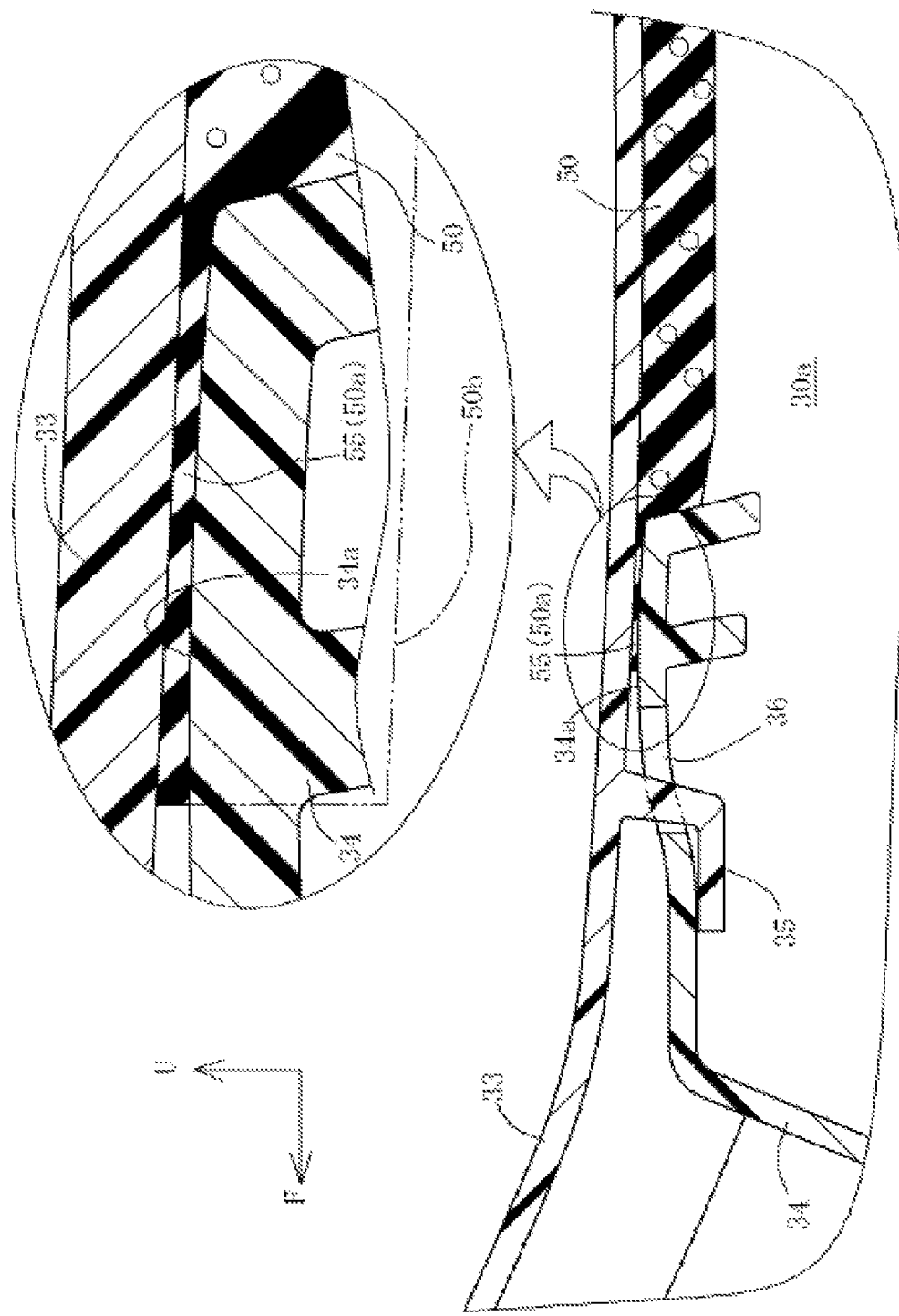
FIG. 6 is a cross-sectional view taken along line 6-6 in FIG. 3.

FIGS. 6 to 9 are each a cross-sectional view showing the sound-absorbing and sound-insulating structure at each part in the air cleaner 30 in the state where the seat 21 is attached. FIG. 6 shows the engaging structure realized by the bottom plate 33 of the seat 21 and the engaging hooks 35 of the reinforcing member 34, and is an enlarged cross-sectional view substantially taken along line 6-6 in FIG. 3. FIG. 7 is a cross-sectional view taken along line 7-7 in FIG. 1, showing just the seat 21, the reinforcing member 34, the front cover 22, the side covers 23, the sound absorbing member 50, and the side seals 52, while omitting other elements. FIG. 8 is a cross-sectional view taken along line 8-8 in FIG. 1, showing the bottom plate 33 of the seat, the side covers 23, the rear cover 25, the sound absorbing member 50, and the side seals 52, while omitting other elements. FIG. 9 is a cross-sectional view taken along line 9-9 in FIG. 1.

In FIG. 6, the front part 50a of the sound absorbing member 50 is formed to reach the position near the engaging hooks 35. Further, when the seat 21 is attached, the crossing part 34a at the top of the reinforcing member 34 is positioned in close proximity to the bottom surface of the bottom plate 33 leaving a slight gap. When the engaging hooks 35 are inserted into and engaged with the engaging holes 36, the portion of the bottom plate 33 near the engaging hooks 35 becomes close to the crossing part 34a, to press the front part 50a thereby compressing the front part 50a.

As shown in the circled enlarged portion, the front part 50a is compressed to be substantially thin plate-like. A phantom line 50b represents the lower surface of the sound absorbing member 50 before being compressed.

The front part 50a compressed in this manner closely attaches to the bottom plate 33 and the crossing part 34a by virtue of its elasticity, and serves as a front seal 55 airtightly sealing between the bottom plate 33 and the crossing part 34a.

Here, since the foam of the front part 50a is compressed, the front seal 55 does not exhibit the sound absorbing performance. On the other hand, by virtue of the enhanced sealing performance, the intake noise in the air cleaner 30 is prevented from leaking outside from the front part 50a, that is, the front seal 55 exhibits the sound insulating performance.

In other words, the uncompressed sound absorbing member 50 exhibits excellent sound absorbing performance by virtue of its open cell foam structure, and the compressed sound absorbing member 50 serves as a sealing member and exhibits the sound insulating performance.

Note that, what compression degree achieves the sound insulating performance is dependent on the type of the foam material or the size of the open cell and, therefore, the compression amount is set to the optimum value as occasion arises.

Further, in the sound absorbing member 50, the portion on the rear side than the front part 50a is not compressed and exhibits excellent sound absorbing performance.

Thus, the front seal 55 is formed integrally with the sound absorbing member 50 and, therefore, one sound absorbing member 50 effects both the sound absorbing purpose and the sound insulating purpose.

Furthermore, since the sound insulating part is formed by attaching the seat 21 which is realized by the engagement between the engaging hooks 35 and the engaging holes 36, any dedicated structure implemented by a special seal is not required. Thus, the simplified structure is provided.

As shown in FIG. 7, when the seat 21 is attached, the front parts 52a of the side seals 52 seal between the side walls 33a of the bottom plate 33 of the seat 21 and the reinforcing member side parts 34c. Note that, the enlarged part in FIG. 7 shows the front part 52a of one side seal 52 in an enlarged manner. The front part 52a of the side seal 52 is entirely compressed between corresponding side wall 33a of the bottom plate 33 and corresponding reinforcing member side part 34c. Into the lower part of the front part 52a of each side seal 52, the tip of the rising wall part 23a of corresponding side cover 23 digs. Any clearance between each rising wall part 23a and corresponding side wall 33a of the bottom plate 33 and corresponding reinforcing member side part 34c is also sealed.

The rising wall part 23a is formed at the upper part of each side cover 23, so as to extend inward and then upward in parallel to corresponding side wall 33a of the bottom plate 33. The rising wall part 23a is interposed between the inner side of corresponding side wall 33a of the bottom plate 33 and the outer side of corresponding reinforcing member side part 34c, and overlaps with them.

The side seals 52 and the sound absorbing member 50 are made of a soft material that easily elastically deforms. Therefore, when the lower surfaces of the side seals 52 are pressed against the tips of the rising wall parts 23a, the tips of the rising wall parts 23a easily dig into the side seals 52.

Note that, in order to facilitate and ensure such digging of the rising wall parts 23a into the side seals 52, the front parts 52a of the side seals 52 may be provided with grooves 52c into which the tips of the rising wall parts 23a fit.

The upper part of the front part 52a of each side seal 52 extends higher than corresponding rising wall part 23a, and compressed to have a substantially acute triangular cross-section by being pressed between corresponding side wall 33a of the bottom plate 33 and corresponding reinforcing member side part 34c disposed inner than the side wall 33a with a certain distance therefrom.

Each reinforcing member side part 34c forms an inclined surface steeper than the side wall 33a of the bottom plate 33. The virtual lines respectively extended upward from the side wall 33a of the bottom plate 33 and the reinforcing member side part 34c cross each other above them by an acute angle.

When the seat 21 is attached, the side walls 33a of the bottom plate 33 are overlaid on the outer side of the reinforcing member side parts 34c. Here, the side seals 52 are pressed against the reinforcing member 34 positioned below. Accordingly, by the reinforcing member side parts 34c pushing inner surfaces 52d of the front parts 52a of the side seals 52 at the initial position toward the side walls 33a of the bottom plate 33, the side seals 52 are compressed to form the seal parts which are excellent in the sound insulating performance.

The front parts 52a of the side seals 52 are previously bonded to the inner side of the side walls 33a of the bottom plate 33. The lower parts of the front parts 52a of the side seals 52 are inclined outward conforming to the inclination of the side walls 33a of the bottom plate 33. Hence, when the side walls 33a of the bottom plate 33 cover externally from above the reinforcing member side parts 34c, the front parts 52a of the side seals 52 are easily compressed between the side walls 33a of the bottom plate 33 and the reinforcing member side parts 34c. Additionally, each side wall 33a of the bottom plate 33 and corresponding reinforcing member side part 34c form an acute-angle gap which narrows upward. Thus, the upper part of the front part 52a of each side seal 52 is strongly compressed, whereby high sealing performance is attained.

As shown in FIG. 8, the rear parts 52b of the part seals 52 seal between the side walls 33a of the bottom plate 33 and the rising wall parts 23a of the side covers 23. The rising wall part 23a of each side cover 23 forms a steep inclined surface while forming an acute angle relative to corresponding side wall 33a of the bottom plate 33. The tip of each rising wall part 23a digs into corresponding side seal 52 from below. The digging length is greater than that on the front part 52a side, and the tip of each rising wall part 23a substantially reaches the position near the upper surface 52e of the rear part 52b of corresponding side seal 52. Note that, the enlarged view in FIG. 8 shows the rear part 52b of one side seal 52 in an enlarged manner. The outer side of the rear part 52b of each side seal 52 is compressed between corresponding side wall 33a of the bottom plate 33 and corresponding rising wall part 23a, to be a seal part. The inner side of the rear part 52b is uncompressed, and serves as a sound absorbing part inside the air cleaner.

The seal part at the rear part 52b of each side seal 52 is the portion outer than the corresponding rising wall part 23a. Since an outer surface 52f of the rear part 52b is in close contact with the side wall 33a of the bottom plate 33, the outer part is compressed against the rising wall part 23a. Thus, between each side wall 33a of the bottom plate 33 and corresponding rising wall part 23a, the seal part exhibiting high sound insulating performance is formed. Here, the upward extension of the side wall 33a of the bottom plate 33 and the upward extension of the rising wall part 23a are respectively inclined surfaces which cross each other by an acute angle. This structure facilitates and enhances compression of the seal part, similarly to the front part 52a of each side seal 52 shown in FIG. 7.

The thickness (the length in the top-bottom direction in FIG. 8) b of the rear part 52b in each side seal 52 is greater than the thickness (the length in the top-bottom direction of the body part, which is the uncompressed part, of the sound absorbing member 50 excluding the front part 50a) a of the sound absorbing member 50 (a<b). This design facilitates pressing and compressing each rear part 52b with the rising wall part 23a of corresponding side cover 23, and increases the seal surface being in contact with the rising wall part 23a thereby improving the sealing performance. Accordingly, the seal length between the side wall 33a and the rising wall part 23a attains the great length of b. This minimizes leakage of noise to the outside, which would otherwise occur through any space between the side wall 33a and the rising wall part 23a as indicated by arrow h (the enlarged part in FIG. 8). Further, on the side inner than the rising wall part 23a, the inner portion of the side seal 52 absorbing noise minimizes noise transferred to the rising wall part 23a.

The relationship a<b holds true for the front part 52a of each side seal 52. That is, the relationship a<b is established over the entire length of the side seals 52.

Such different thicknesses a and b are easily set by the side seals 52 and the sound absorbing member 50 being components independent of each other.

In FIG. 8, the part around each intake opening 24 forms a duct 24a which projects tube-like inward. From the ducts 24a, the outside air is taken into the dirty room 39 as indicated by arrows c.

FIG. 9 is a cross-sectional view taken around and on the rear side of the crossing part 18a. As shown in FIG. 9, the bottom plate 33 has a gap 54 near the crossing part 18a between the extending recess 33c and the crossing part 18a, which gap realizes intake of the outside air also from the rear side of the seat 21.

Here, inside the extending recess 33c also, the extending part 51 is caused to extend integrally from the sound absorbing member 50, to absorb noise around the gap.

Since the extending part 51 is formed integrally with the sound absorbing member 50, the extending part 51 is provided with ease.

The central part in the top-bottom direction of each side cover 23 bulges sideways, and the air cleaner space 30a extends rearward past the crossing part 18a. Thus, from between the crossing part 18a and the side covers 23 also, the outside air is taken from the rear side in the vehicle body into the dirty room 39.

Here, a side sound absorbing member 53 is bonded to each side cover 23, to absorb the noise of the outside air taken in also from between the crossing part 18a and the side cover 23. Hence, the sound absorbing performance of the air cleaner 30 further improves.

Furthermore, the side sound absorbing members 53 are easily attached, because the side sound absorbing members 53 are bonded to the side covers 23 which are removable.

The side sound absorbing members 53 may be provided to extend frontward past the crossing part 18a. The extending amount can be set as appropriate.

Space is also formed between the crossing part 18a and the rear fender 32. The front of the space is closed with the battery case 41 (FIG. 4).

Next, a description will be given of the operation and effect of the present embodiment.

In FIG. 4, in the air cleaner 30, the air cleaner case 30b having the upper opening 30c (FIG. 3) is formed by the front wall 31, the rear fender 32 and the right and left side covers 23 (FIG. 2).

The upper opening 30c is closed by the seat 21. The bottom plate 33 of the seat 21 replaces a lid which covers the upper opening 30c of the air cleaner case 30b.

From the front side toward the rear side in the air cleaner 30, the clean room 38, the filter 37, and the dirty room 39 are disposed in order. Through the intake opening 24 (FIG. 2), the outside air is taken in from the side parts of the dirty room 39.

The outside air is taken in also from the rear side in the vehicle through the space beneath the rear end of the seat 21.

As indicated by arrow c, the outside air taken into the dirty room 39 from the intake opening 24 passes through the filter 37 as indicated by arrow d thereby cleaned. The cleaned air enters the clean room 38, and sent to the intake port 13a of the cylinder 13 through the intake tube 44 as indicated by arrow e. Further, into the dirty room 39, the outside air is taken in from the rear side in the vehicle body through the gap between the seat 21 and the side covers 23 as indicated by arrow f and arrow g.

Here, while the intake noise occurs in the air cleaner 30, the intake noise is absorbed by the sound absorbing member 50 bonded to the lower surface of the bottom plate 33 and disposed in the air cleaner space 30a. Thus, the noise is reduced to or below a predetermined noise level permitted outside the air cleaner.

Furthermore, since the extending part 51 and the side sound absorbing members 53 (FIG. 9) are additionally provided, the noise is absorbed by these elements also. Thus, the air cleaner 30 with minimized noise is provided.

While the present embodiment does not require a conventional removable lid covering the clean room 38 which serves as the target of attaching the sound absorbing member 50, bonding the sound absorbing member 50 to the bottom plate 33 of the seat 21 implements the sound absorbing structure.

Furthermore, since the sound absorbing member 50 having a relatively wide area is bonded to the bottom plate 33 elongated in the front-rear direction, and the sound absorbing member 50 of a great volume is effectively bonded, the sound absorbing member 50 is disposed in a wider range.

By virtue of the sound absorbing member 50 being bonded to the bottom plate 33 of the seat 21, when the bottom plate 33 of the seat closes the upper opening 30c, the bottom plate 33 of the seat and the sound absorbing member 50 function as a lid covering the upper opening 30c, and the sound absorbing member 50 is disposed in the air cleaner case. Thus, the intake noise in the air cleaner is effectively absorbed.

Further, by virtue of the sound absorbing member 50 being bonded to the bottom plate 33, the sound absorbing member 50 widely covers the large-volume dirty room elongated in the front-rear direction and, hence, fully absorbs the intake noise. Furthermore, the sound absorbing member 50 fully absorbs noise in the dirty room 39 on the upstream side where the intake noise tends to leak than at the intake opening 24 or the like and, hence, effectively reduces the intake noise.

As shown in FIG. 6, the reinforcing member 34 also functioning as the engaging part for the seat is provided at the upper surface of the front wall 31. The front part 50a of the sound absorbing member 50 is placed on the crossing part 34a of the reinforcing member 34, and the engaging hooks 35 provided at the bottom part of the bottom plate 33 engage with the engaging holes 36 provided at the reinforcing member 34, so as to compress the front part 50a between the crossing part 34a of the reinforcing member 34 and the bottom plate 33 to form the front seal 55.

In this manner, by virtue of the front seal 55 being interposed between the reinforcing member 34 forming the front part of the air cleaner space 30a and the bottom plate 33, the intake noise leaking outside from the air cleaner space 30a reduces.

Furthermore, the front seal 55 and the sound absorbing member 50 being integrated with each other facilitates fabrication of the front seal 55.

As shown in FIGS. 3 to 5, the front part of the air cleaner case 30b is defined by the front wall 31 and the reinforcing member 34; the rear part and the bottom part thereof are defined by the rear fender 32; and the right and left sides thereof are defined by the side covers 23. That is, the air cleaner case is mostly formed of not members dedicated to the air cleaner but those members forming the vehicle body. Therefore, the air cleaner case 30b having the upper opening 30c is formed with ease. Furthermore, since the upper opening 30c is closed by the bottom plate 33 of the seat, a lid for the air cleaner case is omitted. Note that, in some cases, the reinforcing member 34 may be formed integrally with the front wall 31 and, therefore, the reinforcing member 34 is not an essential member of the air cleaner case 30b. In the present embodiment, since the reinforcing member 34 is provided independently of the front wall 31, the reinforcing member 34 is one of those members forming the air cleaner case 30b.

As shown in FIGS. 5, 7 to 9, by virtue of each side seal 52 interposed between the rising wall part 23a (upper end) of corresponding side cover 23 forming the side wall of the air cleaner space 30a and the bottom plate 33, leakage of the intake noise from the side part of the seat 21 reduces.

Provision of the front seal 55 and the side seals 52 reduces leakage of the intake noise from the air cleaner in which the upper opening 30c is closed by the seat 21.

Here, each side seal 52 is a component independent of the sound absorbing member 50. As shown in FIG. 8, the thickness b in the top-bottom direction of the side seal 52 is greater than the thickness a of the sound absorbing member 50 (a<b). This enlarges the seal surface of the side seal 52 in contact with the bottom plate 33. Further, the seal length approximates the thickness b which is greater than the thickness a of the sound absorbing member 50. Thus, noise becomes less likely to pass through in the thickness direction of the side seal 52 from the upper part of the side seal 52 between the side cover 23 and the bottom plate 33, and the sealing performance between the side cover 23 and the bottom plate 33 improves.

Further, as shown in FIGS. 7 and 8, at each of the right and left portions of the opening edge surrounding the upper opening 30c, a gap narrowing upward is formed between the rising wall part 23a of each side cover 23 as well as each reinforcing member side part 34c both rising upward and corresponding side wall 33a of the bottom plate 33 of the seat 21. In each gap, the side seal 52, which is a foam, is interposed. Thus, the side seal 52 is compressed to serve as a seal. Here, since the upper part of each side seal 52 is strongly compressed, the compression is easily realized and the high sealing performance is attained.

Note that, the side seals 52 and the sound absorbing member 50 may be identical to or different from each other in material. In the present embodiment, they are made of an identical material.

Further, as shown in FIG. 9, the side sound absorbing members 53 may be bonded to the inner surface of the side covers 23 in the air cleaner 30. This structure further reduces intake noise.

Further, as shown in FIGS. 4 and 9, the seat cushion 21a is formed of expanded polystyrene and, hence, the seat 21 is reduced in weight. The seat cushion 21a formed of expanded polystyrene is poor in sound absorbing performance, and not suitable for the air cleaner 30 in which the bottom plate 33 forms part of the air cleaner 30. However, in the present embodiment, since the sound absorbing member 50 is provided at the bottom plate 33, use of expanded polystyrene is permitted.

The present invention is not limited to the embodiment described above, and variations and applications can be made on the basis of the principle of the present invention.

For example, the material of the sound absorbing member 50 and the side seals 52, 53 is not limited to EPDM, and any of various kinds of foams which is excellent in sound absorbing performance can be used. Further, the cushion material of the seat 21 is not limited to expanded polystyrene, and any of various kinds of low-density foam may be used. Still further, means of carrying out the attaching the sound absorbing member 50 and the side seals 52 to the bottom plate 33 of the seat 21 and the attaching the side sound absorbing members 53 to the air cleaner case 30b is not limited to bonding, and various engaging means including screwing may be employed.

The vehicle in which the air cleaner according to the present invention is installed is not limited to an off-road motorcycle, and may be installed in any saddled vehicle. The side sound absorbing members 53 are not essential and should be employed as appropriate.

REFERENCE SIGNS LIST

21: seat
21a: seat cushion

23: side cover
23a: rising wall part
30: air cleaner
30b: air cleaner case
33: bottom plate
34: reinforcing member
50: sound absorbing member
51: extending part
52: side seal
53: side sound absorbing member
55: front seal

What is claimed is:

1. An air cleaner comprising:
an air cleaner case provided beneath a seat for a saddled vehicle, the air cleaner case having an upper opening upward, the upper opening configured to be closed by a bottom plate of the seat; and
a sound absorbing member bonded to the bottom plate of the seat, the sound absorbing member disposed in the air cleaner, wherein
the air cleaner case includes an engaging part having an engaged hole to be engaged with an engaging hook disposed at an upper surface of a front wall of the air cleaner case, and
the sound absorbing member is formed integrally with a front seal interposed between an upper surface of the engaging part and the bottom plate of the seat, and the front seal and the sound absorbing member is formed of open cell flexible foam, and
a front part of the sound absorbing member is compressed between the bottom plate of the seat and the front seat and the front wall at the engaging part to be the front seal.

2. The air cleaner according to claim 1, wherein
the air cleaner case has its front part formed of the front wall,
the air cleaner case has its rear part and bottom part formed of a rear fender, and
the air cleaner case has its right and left parts respectively formed of side covers.

3. The air cleaner according to claim 1, wherein
the air cleaner case has its side walls respectively formed of side covers each including an upper end, and
between each of the upper ends and the bottom plate of the seat, a side seal is interposed.

4. An air cleaner comprising:
an air cleaner case provided beneath a seat for a saddled vehicle, the air cleaner case having an upper opening upward, the upper opening configured to be closed by a bottom plate of the seat; and
a sound absorbing member bonded to the bottom plate of the seat, the sound absorbing member disposed in the air cleaner, wherein
the air cleaner case has its side walls respectively formed of side covers each including an upper end,
between each of the upper ends and the bottom plate of the seat, a side seal is interposed,
the side seal and the sound absorbing member are formed independently of each other, and
a thickness in a top-bottom direction of the side seal is greater than a thickness in the top-bottom direction of the sound absorbing member.

5. The air cleaner according to claim 2, wherein a side sound absorbing member is bonded to an inner surface of each of the side covers forming the air cleaner case.

6. The air cleaner according to claim 1, wherein the seat includes a seat cushion formed of a low-density foam.

7. An air cleaner comprising:
an air cleaner case provided beneath a seat for a saddled vehicle, the air cleaner case having an upper opening upward, the upper opening configured to be closed by a bottom plate of the seat; and
a sound absorbing member bonded to the bottom plate of the seat, the sound absorbing member disposed in the air cleaner, wherein
an opening edge surrounding the upper opening of the air cleaner case rises upward,
the bottom plate of the seat is provided with a side wall overlapping with a circumference of the opening edge,
the side wall and the opening edge form a gap narrowing upward between the side wall and the opening edge, and
in the gap, a side seal formed of a foam is interposed while being compressed.

* * * * *